US011808189B2

(12) United States Patent
Gensch et al.

(10) Patent No.: US 11,808,189 B2
(45) Date of Patent: Nov. 7, 2023

(54) HIGH-FILTRATION EFFICIENCY WALL-FLOW FILTER

(71) Applicant: UMICORE AG & CO. KG, Hanau-Wolfgang (DE)

(72) Inventors: Manuel Gensch, Aschaffenburg (DE); Martin Foerster, Büdingen (DE); Naina Deibel, Pfungstadt (DE); Antje Oltersdorf, Freiburg (DE); Juergen Koch, Hanau (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 67 days.

(21) Appl. No.: 17/292,068

(22) PCT Filed: Nov. 7, 2019

(86) PCT No.: PCT/EP2019/080483
§ 371 (c)(1),
(2) Date: May 7, 2021

(87) PCT Pub. No.: WO2020/094763
PCT Pub. Date: May 14, 2020

(65) Prior Publication Data
US 2022/0325645 A1  Oct. 13, 2022

(30) Foreign Application Priority Data
Nov. 8, 2018 (DE) .................. 10 2018 127 953.0

(51) Int. Cl.
B01D 46/24 (2006.01)
B01D 53/94 (2006.01)
B01J 37/02 (2006.01)
F01N 3/022 (2006.01)
F01N 3/035 (2006.01)

(52) U.S. Cl.
CPC ......... *F01N 3/035* (2013.01); *B01D 46/2418* (2013.01); *B01D 53/94* (2013.01); *B01J 37/0232* (2013.01); *F01N 3/0222* (2013.01); *B01D 2255/9155* (2013.01); *F01N 2250/02* (2013.01); *F01N 2330/06* (2013.01); *F01N 2370/02* (2013.01); *F01N 2510/0682* (2013.01)

(58) Field of Classification Search
CPC .... F01N 3/035; F01N 3/0222; F01N 2250/02; F01N 2330/06; F01N 2370/02; F01N 2510/0682; B01D 46/2418; B01D 53/94; B01D 2255/9155; B01D 46/0001; B01D 46/0027; B01D 2201/62; B01D 2258/012; B01D 2257/00; B01D 2279/30; B01J 37/0232; B01J 8/006; B01J 37/0215
See application file for complete search history.

(56) References Cited

U.S. PATENT DOCUMENTS

| | | | |
|---|---|---|---|
| 108,408 A | 10/1870 | Tilghman | |
| 1,967,235 A | 7/1934 | Ferkel | |
| 2,488,440 A | 11/1949 | Schaumann | |
| 4,609,563 A | 9/1986 | Shimrock et al. | |
| 6,220,791 B1 | 4/2001 | Hutchins | |
| 6,478,874 B1 | 11/2002 | Rosynsky et al. | |
| 6,548,105 B2 | 4/2003 | Kiessling et al. | |
| 6,875,725 B2 | 4/2005 | Lindner et al. | |
| 8,277,880 B2 | 10/2012 | Sato et al. | |
| 8,388,721 B2 | 3/2013 | Ishizawa | |
| 8,454,917 B2 | 6/2013 | Hoyer et al. | |
| 8,495,968 B2 | 7/2013 | Tsuji et al. | |
| 8,534,221 B2 | 9/2013 | Tsuji et al. | |
| 8,632,852 B2 | 1/2014 | Tsuji et al. | |
| 8,663,588 B2 | 3/2014 | Lindner et al. | |
| 8,678,196 B2 | 3/2014 | Kaiser et al. | |
| 8,794,178 B2 | 8/2014 | Mergner et al. | |
| 9,517,462 B2 | 12/2016 | Roesch et al. | |
| 9,745,227 B2 | 8/2017 | Cai et al. | |
| 2001/0003351 A1 | 6/2001 | Chen et al. | |
| 2008/0107806 A1 | 5/2008 | Mergner et al. | |
| 2011/0030346 A1 | 2/2011 | Neubauer et al. | |
| 2011/0229634 A1 | 9/2011 | Tsuji et al. | |
| 2011/0229635 A1 | 9/2011 | Tsuji et al. | |
| 2013/0243659 A1* | 9/2013 | Sutton et al. ............ B01J 29/44 427/180 |
| 2016/0310935 A1 | 10/2016 | Sutton et al. | |
| 2017/0296969 A1 | 10/2017 | Ohashi et al. | |
| 2018/0298800 A1 | 10/2018 | Clowes et al. | |
| 2021/0396167 A1 | 12/2021 | Foerster et al. | |

(Continued)

FOREIGN PATENT DOCUMENTS

| | | |
|---|---|---|
| DE | 948415 C | 8/1956 |
| DE | 952891 C | 11/1956 |
| DE | 4225970 C1 | 4/1994 |

(Continued)

OTHER PUBLICATIONS

U.S. Appl. No. 17/292,059, Foerster, et al., May 7, 2021.
U.S. Appl. No. 17/292,080, Foerster, et al., May 7, 2021.
International Preliminary Report on Patentability dated May 11, 2021 for International Patent Application No. PCT/EP2019/080483 (6 pages in German with English Translation).
Written Opinion of the International Searching Authority dated Feb. 5, 2020 for International Patent Application No. PCT/EP2019/080483 (5 pages in German with English Translation).
International Search Report dated Feb. 5, 2020 for International Patent Application No. PCT/EP2019/080483 (4 pages in German with English Translation).

(Continued)

*Primary Examiner* — Timothy C Vanoy
(74) *Attorney, Agent, or Firm* — Smith, Gambrell & Russell, LLP

(57) ABSTRACT

The invention relates to a method for producing a wall-flow filter for removing fine particulate solids from gases, and to the use thereof for cleaning exhaust gases of an internal combustion engine. The invention also relates to a correspondingly produced exhaust-gas filter having a high filtration efficiency.

20 Claims, 1 Drawing Sheet

(56) References Cited

U.S. PATENT DOCUMENTS

Figure 1:
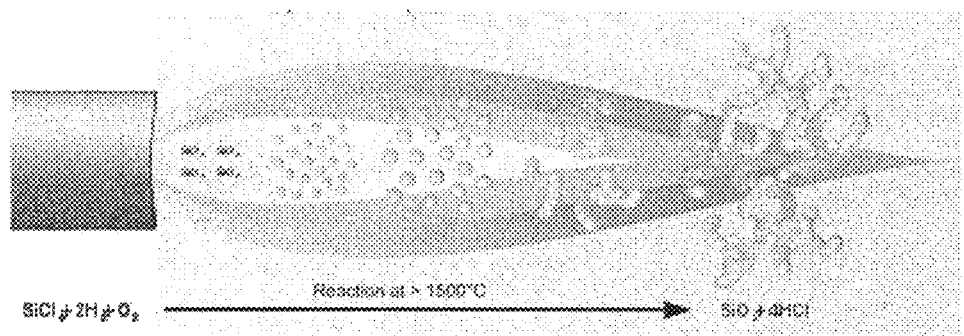

2021/0404357 A1   12/2021   Foerster et al.

FOREIGN PATENT DOCUMENTS

| | | |
|---|---|---|
| DE | 19921409 A1 | 11/2000 |
| DE | 102009010711 A1 | 9/2010 |
| DE | 102010007499 A1 | 8/2011 |
| DE | 102010015364 A1 | 10/2011 |
| EP | 1 064 094 B1 | 9/2002 |
| EP | 1 181 970 B1 | 2/2004 |
| EP | 1 136 462 B1 | 8/2004 |
| EP | 1 576 998 A2 | 9/2005 |
| EP | 2 388 072 A1 | 11/2011 |
| EP | 2 412 419 A1 | 2/2012 |
| EP | 2 415 522 A1 | 2/2012 |
| EP | 2 502 661 A2 | 9/2012 |
| EP | 2 576 021 A1 * | 4/2013 |
| EP | 2 521 618 B1 | 8/2013 |
| EP | 1 541 220 B1 | 2/2014 |
| EP | 2 727 640 A1 | 5/2014 |
| EP | 2 502 662 B1 | 6/2014 |
| EP | 2 727 640 A1 * | 7/2014 |
| EP | 2 783 755 A1 | 10/2014 |
| EP | 2 576 021 B1 | 12/2014 |
| EP | 2 832 962 A1 | 2/2015 |
| EP | 2 371 451 B1 | 3/2016 |
| EP | 2 371 452 B1 | 3/2016 |
| EP | 1 789 190 B1 | 6/2017 |
| JP | H01-151706 A | 6/1989 |
| JP | 5378659 B2 | 12/2013 |
| JP | 2014-205108 A | 10/2014 |
| WO | 99/47260 A1 | 9/1999 |
| WO | 2005/016497 A1 | 2/2005 |
| WO | 2005/022667 A2 | 3/2005 |
| WO | 2008/000449 A2 | 1/2008 |
| WO | 2008/113445 A1 | 9/2008 |
| WO | 2010/015573 A2 | 2/2010 |
| WO | 2010/097146 A1 | 9/2010 |
| WO | 2011/151711 A1 | 12/2011 |
| WO | WO 2011 152 711 A1 * | 12/2011 |
| WO | 2012/030534 A1 | 3/2012 |
| WO | 2015/049110 A1 | 4/2015 |
| WO | WO 2015 121 248 A1 * | 8/2015 ............. B01D 53/94 |
| WO | 2015/143191 A1 | 9/2015 |
| WO | 2017/056067 | 4/2017 |
| WO | 2017/075328 A1 | 5/2017 |
| WO | 2018/115900 A1 | 6/2018 |
| WO | 2018/172299 A1 | 9/2018 |
| WO | 2019/089806 A1 | 5/2019 |
| WO | 2020/094760 A1 | 5/2020 |
| WO | 2020/094766 A1 | 5/2020 |

OTHER PUBLICATIONS

Gutsch, A. et al. Gas-Phase Production of Nanoparticles.KONA. 2002. No. 20. 14 pages.

Ulrich, G. Theory of Particle Formation and Growth in Oxide Synthesis Flames. Combustion Science and Technology. 1971. vol. 4. pp. 47-57.

Ihalainen, M., et al. Break-Up and bounce of TiO2 agglomerates by impaction. J. In: Aerosol Science and Technology. 2014. vol. 48, No. 1, pp. 31-41.

Seipenbusch, M., et al. Interparticle forces in silica nanoparticle agglomerates Journal of Nanoparticle Research. 2010. vol. 12, No. 6, pp. 2037-2044.

Gensch, M. Dissertation, Mechanische Stabilität von Nanopartikel-Agglomeraten bei mechanischen Belastungen. 2018. ISBN: 978-3-8440-6110-9, Shaker Verlag.

Füchsel, S., et al. Trockene Desagglomeration von Nanopartikelagglomeraten in einer Sichtermühle. [Dry deagglomeration of nanoparticle agglomerates in a classifier mill]. Chemie Ingenieur Technik. 2011, 83, No. 8, pp. 1262-1275. (In German with English translation).

Li S., et al. Flame aerosol synthesis of nanostructured materials and functional devices: Processing, modeling, and diagnostics. Progress in Energy and Combustion Science (55). 2016. pp. 1-59.

Heck, R., et al., Catalytic Air Pollution Control—Commercial Technology, Wiley. 2002. pp. 86-89.

Aerosolgeneratoren Und—Dispergierer. accessed May 7, 2018. http://www.tsi.com/Aerosolgeneratoren-und-dispergierer/.

Pyrogenes Siliciumdioxid. Wikipedia. Accessed Nov. 16, 2018. https://de.wikipedia.org/w/index.php?title=Pyrogenes_Siliciumdioxid&oldid=182147815.

Aerosolgematoren fur Feststoffe. Accessed May 7, 2018. https://www.palas.de/de/product/aerosolgeneratorssolidparticles.

Reindichte. Wikipedia. Accessed Nov. 16, 2018. https://de.wikipedia.org/w/index.php?title=Reindichte&oldid=164022376.

Pyrogenes Siliciumdioxid. Wikipedia, accessed Nov. 16, 2018. https://de.wikipedia.org/wiki/Pyrogenes_Siliciumdioxid.

Aerosil Fumed Silica and Aeoxide Fumed Alumina for Glossy Photo Inkjet Media. Technical Information 1331. https://www.aerosil.com/product/aerosil/downloads/ti-1331-aerosil-and-aeroxide-for-glossy-photo-inkjet-media-en.pdf.

Fumed silica process.svg. Wikimedia Commons. Accessed Nov. 28, 2016. https://commons.wikimedia.org/w/index.php?title=File:Fumed_silica_process.svg&oldid=222460038.

Framework type AEI. Database of Zeolite Structures. accessed Apr. 10, 2018. http://europe.iza-structure.org/IZA-SC/framework.php?STC=CHA.

Framework type CHA. Database of Zeolite Structures. accessed Apr. 10, 2018. http://europe.iza-structure.org/IZA-SC/framework.php?STC=AEI.

ISO 13320: 2009(E). Particle size analysis—Laser diffraction Methods (60 pages).

DIN 66133. Jun. 1993, Bestimmung der Porenvolumenverteilung und der spezifischen Oberfläche von Feststoffen durch Quecksilberintrusionv. [Determination of the pore volume distribution and the specific surface area of solids by mercury intrusion] (3 pages in German with machine translation).

DIN 66134. Feb. 1998, Bestimmung der Porengrößenverteilung und der spezifischen Oberfläche mesoporöser Feststoffe durch Stickstoffsorption Verfahren nach Barrett, Joyner und Halenda (BJH) [Determination of the pore size distribution and the specific surface mesoporous solids by nitrogen sorption Procedure according to Barrett, Joyner and Halenda (BJH)] (7 pages in German with machine translation).

Mathis. U., et al., TEM analysis of volatile nanoparticles from particle trap equipped diesel and direct-injection spark-ignition vehicles. Atmospheric Environment. vol. 38, pp. 4347-4355, 2004.

Albers, P., et al. Kristallin und amorph Sand als Rohstoff. [Crystalline and amorphous sand as a raw material]. Chemie in unserer Zeit, 2016, vol. 50, pp. 162-171 (in German with English translation).

von Karman, T. Ueber den Mechanismus des Widerstandes, den ein bewegter Körper in einer Flüssigkeit erfährt [About the mechanism of resistance a moving body experiences in a liquid] Nachr. Ges. Wiss. Göttingen, Math. Phys. Kl. 509 (1911); 547 (1912) (In German with English Translation).

Benard, H. Comptes rendus hebdomadaires des séances de l'Académie des sciences/ publiés . . . par MM. les secrétaires perpétuels. [Weekly reports of the sessions of the Academy of Sciences / published . . . by MM. perpetual secretaries] C. R. Acad. Sci. Paris Ser. IV 147, 839 (1908); 147, 970 (1908) (In French with English translation).

Hall, D.E., et al., Measurement of the Number of Siz Distribution of Particles Emitted from a Gasoline Direct Injection Vehicle. SAE. 1999-01-3530. pp. 1-11, 1999.

Ferkel, H., et al. Edelmetallfreie Nanokatalysatoren Für Dieselpartikelfilter [Non-Metal-Free Nanocatalysts for diesel Particulate Filters]. MTZ—Motortechnische Zeitschrift, 2010, vol. 71, pp. 128-133. In German with English translation.

Hinds, W.C. Aerosol technology: Properties, behavior and measurement of airborne particles. Wiley, $2^{nd}$ edition. 1999. 200 Pages.

Maricq, M.M., et al., Particulate Emissions from a Direct-Injection Spark-Ignition (DISI) Engine. SAE, 1999-01-1530, 1999. pp. 1-9.

ISO 11465—Soil Quality—Determination fo dry matter and water content on a mass basis—Gravimetric Method. 1993 (8 pages).

(56) References Cited

OTHER PUBLICATIONS

Stieβ, M. Mechanical Process Engineering—Particle Technology 1, Springer, 3rd edition 2009. Kapitel 2. Kennzeichnungen von Partikeln und dispersen Stoffsystemen [Chapter 2 Identification of particles and disperse Substance systems] pp. 9-95 in German with English translation.
Final Office Action dated Jun. 28, 2022 in U.S. Appl. No. 17/292,059 (14 pages).
Non Final Office Action dated Dec. 9, 2021 in U.S. Appl. No. 17/292,059 (11 pages).
Notice of Opposition to a European Patent dated Apr. 11, 2023 in European Patent Application No. 19801526.5 (16 pages).
Jang, Hee Dong et al. Synthesis of $SiO_2$ nanoparticles from sprayed droplets of tetraethylorthosilicate by the flame spray pyrolysis. Current Applied Physics 6S1. 2006. pp. e110 to e113.
Non Final Office Action dated Jun. 28, 2023 in U.S. Appl. No. 18/069,736 (13 pages).

* cited by examiner

HIGH-FILTRATION EFFICIENCY WALL-FLOW FILTER

The present invention relates to a method for producing a wall-flow filter for removing fine particulate solids from gases, and to the use thereof for cleaning exhaust gases of an internal combustion engine. The invention also relates to a correspondingly produced exhaust-gas filter having a high filtration efficiency.

The exhaust gas of internal combustion engines in motor vehicles typically contains the harmful gases carbon monoxide (CO) and hydrocarbons (HC), nitrogen oxides ($NO_x$), and possibly sulfur oxides ($SO_x$), as well as particulates that mostly consist of solid carbon-containing particles and possibly adherent organic agglomerates. These are called primary emissions. CO, HC, and particulates are the products of the incomplete combustion of the fuel inside the combustion chamber of the engine. Nitrogen oxides form in the cylinder from nitrogen and oxygen in the intake air when combustion temperatures exceed 1200° C. Sulfur oxides result from the combustion of organic sulfur compounds, small amounts of which are always present in non-synthetic fuels. Compliance in the future with statutory exhaust emission limits for motor vehicles applicable in Europe, China, North America, and India requires the extensive removal of said harmful substances from the exhaust gas. For the removal of these emissions, which are harmful to health and environment, from the exhaust gases of motor vehicles, a variety of catalytic technologies for the purification of exhaust gases have been developed, the fundamental principle of which is usually based upon guiding the exhaust gas that needs purification over a flow-through or wall-flow honeycomb body with a catalytically active coating applied thereto. The catalytic converter facilitates the chemical reaction of different exhaust gas components, forming non-hazardous products, such as carbon dioxide, water, and nitrogen.

The flow-through or wall-flow honeycomb bodies just described are also called catalyst supports, carriers, or substrate monoliths, as they carry the catalytically active coating on their surface or in the walls forming this surface. The catalytically active coating is often applied to the catalyst support in the form of a suspension in a so-called coating operation. Many such processes in this respect were published in the past by automotive exhaust-gas catalytic converter manufacturers (EP1064094B1, EP2521618B1, WO10015573A2, EP1136462B1, U.S. Pat. No. 6,478,874 B1, U.S. Pat. No. 4,609,563A, WO9947260A1, JP5378659B2, EP2415522A1, JP2014205108A2).

The operating mode of the internal combustion engine is decisive for the possible methods of harmful substance conversion in the catalytic converter in each case. Diesel engines are usually operated with excess air, most spark-ignition engines with a stoichiometric mixture of intake air and fuel. "Stoichiometric" means that on average exactly as much air is available for combustion of the fuel present in the cylinder as is required for complete combustion. The combustion air ratio λ (A/F ratio; air/fuel ratio) sets the air mass $m_{L,actual}$ which is actually available for combustion in relation to the stoichiometric air mass $m_{L,st}$:

$$\lambda = \frac{m_{L,actual}}{m_{L,st}}$$

If λ<1 (e.g., 0.9), this means "air deficiency" and one speaks of a rich exhaust gas mixture; λ>1 (e.g., 1.1) means "excess air" and the exhaust gas mixture is referred to as lean. The statement λ=1.1 means that 10% more air is present than would be required for the stoichiometric reaction.

When lean-burn motor vehicle engines are mentioned in the present text, reference is thereby made mainly to diesel engines and to predominantly on average lean-burn spark-ignition engines. The latter are gasoline engines predominantly operating on average with a lean A/F ratio (air/fuel ratio). In contrast, most gasoline engines are operated with an on average stoichiometric combustion mixture. In this respect, the expression "on average" takes into consideration the fact that modern gasoline engines are not statically operated with a fixed air/fuel ratio (A/F ratio; λ value). It is rather the case that a mixture with a discontinuous course of the air ratio λ around λ=1.0 is predetermined by the engine control system, resulting in a periodic change between oxidizing and reducing exhaust gas conditions. This change in the air ratio λ is significant for the exhaust gas purification result. To this end, the λ value of the exhaust gas is regulated with a very short cycle time (approx. 0.5 to 5 Hz) and an amplitude Δλ of 0.005≤Δλ≤0.07 around the value λ=1.0. On average, the exhaust gas under such operating states should therefore be described as "on average" stoichiometric. In order to ensure that these deviations do not adversely affect the result of exhaust gas purification when the exhaust gas flows over the three-way catalytic converter, the oxygen-storing materials contained in the three-way catalytic converter balance out these deviations by absorbing oxygen from the exhaust gas or releasing it into the exhaust gas as needed (R. Heck et al., Catalytic Air Pollution Control, Commercial Technology, Wiley, 2nd edition 2002, p. 87). However, due to the dynamic mode of operation of the engine in the vehicle, further deviations from this state also occur at times. For example, under extreme acceleration or while coasting, the operating states of the engine, and thus of the exhaust gas, can be adjusted and can, on average, be hypostoichiometric or hyperstoichiometric. However, lean-burn spark-ignition engines have an exhaust gas which is predominantly, i.e., for the majority of the duration of the combustion operation, combusted with an air/fuel ratio that is lean on average.

The harmful gases carbon monoxide and hydrocarbons from a lean exhaust gas can easily be rendered harmless by oxidation on a suitable oxidation catalyst. In a stoichiometrically operated internal combustion engine, all three harmful gases (HC, CO, and NOx) can be eliminated via a three-way catalytic converter.

The reduction of nitrogen oxides to nitrogen ("denitrification" of the exhaust gas) is more difficult on account of the high oxygen content of a lean-burn engine. A known method is selective catalytic reduction (SCR) of the nitrogen oxides in a suitable catalytic converter or SCR catalytic converter for short. This method is currently preferred for the denitrification of lean-engine exhaust gases. The nitrogen oxides contained in the exhaust gas are reduced in the SCR method with the aid of a reducing agent metered into the exhaust tract from an external source. Ammonia is used as the reducing agent, which converts into nitrogen and water the nitrogen oxides present in the exhaust gas at the SCR catalytic converter. The ammonia used as reducing agent may be made available by metering an ammonia precursor compound, for example urea, ammonium carbamate, or ammonium formate, into the exhaust tract, and by subsequent hydrolysis.

Diesel particulate filters (DPF) or gasoline particulate filters (GPF) with and without additional catalytically active coating are suitable aggregates for removing the particulate emissions. In order to meet the legal standards, it is desirable for current and future applications for the exhaust gas aftertreatment of internal combustion engines to combine particulate filters—particularly those of the wall-flow type—with other catalytically active functionalities, not only for reasons of cost but also for reasons of installation space. The use of a particulate filter, whether catalytically coated or not, leads to a noticeable increase in the exhaust-gas back pressure in comparison with a flow-through support of the same dimensions and thus to a reduction in the torque of the engine or possibly to increased fuel consumption. In order to not increase the exhaust-gas back pressure even further, the amounts of oxidic support materials for the catalytically active noble metals of the catalytic converter or oxidic catalyst materials are generally applied in smaller quantities in the case of a filter than in the case of a flow-through support. As a result, the catalytic effectiveness of a catalytically coated particulate filter is frequently inferior to that of a flow-through monolith of the same dimensions.

There have already been some efforts to provide particulate filters which have good catalytic activity due to an active coating and yet have the lowest possible exhaust-gas back pressure. On the one hand, it has proven to be advantageous if the catalytically active coating is not present as a layer on the wall of a porous wall-flow filter, but instead the wall of the filter is interspersed with the catalytically active material (WO2005016497A1, JPH01-151706, EP1789190B1). For this purpose, the particle size of the catalytic coating is selected such that the particles penetrate into the pores of the wall-flow filters and can be fixed there by calcination.

A further functionality of the filter which can be improved by a coating is its filtration efficiency, i.e., the filtering effect itself. The increase in the filtration efficiency of catalytically inactive filters is described in WO2012030534A1. In this case, a filtration layer ("discriminating layer") is created on the walls of the flow channels of the inlet side by the deposition of ceramic particles via a particle aerosol. The layers consist of oxides of zirconium, aluminum, or silicon, preferably in fiber form ranging from 1 nm to 5 µm, and have a layer thickness greater than 10 µm, typically 25 µm to 75 µm. After the coating process, the applied powder particles are calcined in a thermal process.

A coating inside the pores of a wall-flow filter unit by spraying dry particles is described in U.S. Pat. No. 8,388,721 B2. In this case, however, the powder should penetrate deeply into the pores. 20% to 60% of the surface of the wall should remain accessible to soot particles, thus open. Depending on the flow velocity of the powder/gas mixture, a more or less steep powder gradient between the inlet and outlet sides can be set.

The introduction of the powder into the pores, for example by means of an aerosol generator, is also described in EP2727640A1. Here, a non-catalytically coated wall-flow filter is coated using a gas stream containing, for example, aluminum oxide particles in such a way that the complete particles, which have a particle size of 0.1 µm to 5 µm, are deposited as a porous filling in the pores of the wall-flow filter. The particles themselves can realize a further functionality of the filter in addition to the filtering effect. For example, these particles are deposited in the pores of the filter in an amount greater than 80 g/l based on the filter volume. They fill in 10% to 50% of the volume of the filled pores in the channel walls. This filter, both loaded with soot and without soot, has an improved filtration efficiency compared with the untreated filter together with a lower exhaust-gas back pressure of the soot-loaded filter.

EP2502661A1 and EP2502662B1 mention further methods for the on-wall coating of filters by powder application. Corresponding apparatuses for applying a powder/gas aerosol to the filter, in which the powder applicator and the wall-flow filter are each separated so that air is sucked in through this space during coating, are also shown there. A further method in which a membrane ("trapping layer") is produced on the surfaces of the inlet channels of filters in order to increase the filtration efficiency of catalytically inactive wall-flow filters is described in patent specification U.S. Pat. No. 8,277,880B2. The filtration membrane on the surfaces of the inlet channels is produced by sucking a gas stream loaded with ceramic particles (for example, silicon carbide, cordierite) through. After application of the filter layer, the honeycomb body is fired at temperatures greater than 1000° C. in order to increase the adhesive strength of the powder layer on the channel walls.

WO2011151711A1 describes a method by which a dry aerosol is applied to an uncoated or catalytically coated filter. The aerosol is provided by the distribution of a powdered high-melting metal oxide having an average particle size of 0.2 µm to 5 µm and guided through the inlet side of a wall-flow filter by means of a gas stream. In this case, the individual particles agglomerate to form a bridged network of particles and are deposited as a layer on the surface of the individual inlet channels passing through the wall-flow filter. The typical powder loading of a filter is between 5 g and 50 g per liter of filter volume. It is expressly pointed out that it is not desirable to obtain a coating inside the pores of the wall-flow filter with the metal oxide.

EP1576998A2 describes the production of a thin membrane, <5 µm, on the output side of the porous cell wall. The porous membrane is made of nanoparticles having diameters between 20 and 200 nm. In order to fix the membrane on the outlet side of the wall-flow filter, a final calcination takes place here.

U.S. Pat. No. 9,745,227B2 describes the production of an application layer with porous particle agglomerates having a diameter between 10 and 200 µm. These agglomerates, in turn, are prepared in an upstream process from particles having dimensions between 0.01 and 5 µm. The applied layer must then be calcined.

WO18115900A1 mentions the oxidic powders of synthetic ash with a d90<1 µm. The filters are coated therewith in such a way that a packed bed of synthetic ash is formed on the filter walls.

However, there are further requirements for particulate filters for which solutions are still being sought. This relates, for example, to improved soot burn-off and the introduction of additional reactive zones for controlling the catalytic reactions.

The object of the present invention was accordingly to specify further and improved particulate filters, also called wall-flow filters, which are optimized with regard to their filtration efficiency and the resulting exhaust-gas back pressure. Moreover, the filters should be easy to manufacture in a robust and flexible working process and inexpensive.

These and other objects that are obvious from the prior art to a person skilled in the art are achieved by a method according to independent claim 1. Preferred embodiments of the method can be found in the subclaims that are dependent upon claim 1. Claim 10 is directed to a correspondingly produced wall-flow filter. Claim 11 includes a preferred use.

In a method for producing a wall-flow filter for purifying gases from small particulate solids, the stated object can be achieved extremely advantageously by applying a dry powder/gas aerosol to the inlet region of the dry filter, the powder having a pyrogenic, high-melting metal compound produced by flame hydrolysis or flame oxidation from a metal precursor in a flame and the amount of pyrogenic high-melting compound in the filter being less than 5 g/l. The wall-flow filters produced according to the invention are preferably used in the purification of exhaust gases from internal combustion engines. They filter the soot formed during the combustion out of the exhaust gas and thereby lead only to a slight increase in the exhaust-gas back pressure. This result can be achieved even with a relatively small amount of pyrogenic material. Against the background of the known prior art, this was not to be expected.

The application of the dry powder/gas aerosol to the dry, possibly catalytically coated filter results in the powdered, pyrogenic metal compounds being deposited following the flow of the gas on the surface of the input side of the filter and optionally in the pores of the filter. In principle, the person skilled in the art knows how to produce an aerosol from a pyrogenic powder and a gas in order to then guide the aerosol through the filter to which the powder is to be applied. In order to produce a wall-flow filter, a dry filter is advantageously provided on its input surface with the dry, pyrogenic powder/gas aerosol, by dispersing the powder in a gas, directing it into a gas stream and sucking or pressing it into the inlet side of the filter without further supply of a gas. For reasons of occupational safety, suction is preferable to pressing.

The aerosol consisting of the gas and the pyrogenic metal compound may be produced in accordance with the requirements of the person skilled in the art. For this purpose, a pyrogenically produced metal powder is usually mixed with a gas (http://www.tsi.com/Aerosolgeneratoren-und-dispergierer/; https://www.palas.de/de/product/aerosolgenerators-solidparticles). This mixture of gas and powder produced in this way is then advantageously fed into the inlet side of the wall-flow filter via a gas stream. The term "inlet side" refers to the part of the filter formed by the inflow channels/input channels. The input surface is formed by the wall surfaces of the inflow channels/input channels on the input side of the wall-flow filter. The same applies mutatis mutandis to the outlet side.

All gases considered by the person skilled in the art for the present purpose can be used as gases for producing the aerosol and for inputting into the filter. The use of air is most particularly preferred. However, it is also possible to use other reaction gases which can develop either an oxidizing (e.g. $O_2$, $NO_2$) or a reducing (e.g. H2) activity with respect to the powder used. With certain powders, the use of inert gases (e.g. N2) or noble gases (e.g. He) may also prove advantageous. Mixtures of the listed gases are also conceivable.

In order to be able to deposit the powder sufficiently well on and/or in the surface of the filter wall on the inlet side of the filter, a certain suction or pressure force is needed. In orientation experiments for the respective filter and the respective powder, the person skilled in the art can form an idea for himself in this respect. It has been found that the aerosol (powder/gas mixture) is preferably sucked through the filter at a velocity of 5 m/s to 60 m/s, more preferably 10 m/s to 50 m/s, and very particularly preferably 15 m/s to 40 m/s, since this corresponds to the later exhaust gas velocities. This likewise achieves an advantageous adhesion of the applied powder. Most preferably, gas velocities corresponding to those of the later exhaust gas to be purified are used. The use of certain gas velocities in front of the filter during the coating in the region of the later exhaust gas velocities in front of the filter results in a powder distribution and thus a distribution of the filtering surface in the filter which optimally matches the flow of particulates in the exhaust gas. The velocities are adapted to the requirements in the respective application of the filter within the scope of the invention. For filters with a uniform permeability distribution over the filter, this means that, as a rule, more powder is deposited in the last third of the filter in the flow direction. If permeability is distributed non-uniformly in the filter, for example as a result of zone coatings, this usually means that the powder is preferably deposited in the regions of high permeability, since the volume flow during the coating is also the highest in the region of high permeability subsequently during use as an exhaust-gas filter.

The amount of powder in the filter depends on the type of powder and to the dimensions of the filter and can be determined by the person skilled in the art in preliminary experiments under the given boundary conditions (not too high an exhaust-gas back pressure). As a rule and according to the invention, the loading of the filter with the pyrogenic powder is less than 5 g/l relative to the filter volume. The value is preferably not more than 3 g/l, very particularly preferably not more than 2 g/l. A lower limit is naturally formed by the desired increase in filtration efficiency. In this context it is particularly preferred if the amount of powder remaining in the filter is below 2 g/l.

By applying the special powder/gas aerosol to the filter, the filtration efficiency or the exhaust-gas back pressure of the filter with possibly additional catalytic functions can be adjusted well to the respective conditions in the exhaust tract, for example of an automobile. The development of the designs adapted to the different requirements in each case is cost-effective and flexible. The production process is also cost-effective, since several different types of powder, which optionally perform different functions, can be loaded in the same installation, for example with two and more applicators, directly one after the other in time, separated only by fractions of seconds.

The filters described herein, which are possibly previously catalytically coated and then loaded with pyrogenic powders, differ from those that are produced in the exhaust tract of a vehicle by ash deposition during operation. According to the invention, the optionally catalytically active filters are deliberately dusted with a specific, dry powder in the form of a pyrogenically produced material, for example a metal oxide. As a result, the balance between filtration efficiency and exhaust-gas back pressure can be adjusted selectively right from the start. Wall-flow filters in which more or less undefined ash deposits have resulted from combustion of fuel, for example in the cylinder during driving operation or by means of a burner, are therefore not included in the present invention.

All ceramic materials customary in the prior art can be used as wall-flow monoliths or wall-flow filters. Porous wall-flow filter substrates made of cordierite, silicon carbide, or aluminum titanate are preferably used. These wall-flow filter substrates have inflow and outflow channels, wherein the respective downstream ends of the inflow channels and the upstream ends of the outflow channels are offset against each other and closed off with gas-tight "plugs." In this case, the exhaust gas that is to be purified and that flows through the filter substrate is forced to pass through the porous wall between the inflow channel and outflow channel, which delivers an excellent particulate filtering effect. The filtration property for particulates can be designed by means of porosity, pore/radii distribution, and thickness of the wall. The porosity of the uncoated wall-flow filters is typically more than 40%, generally from 40% to 75%, particularly from 50% to 70% [measured according to DIN 66133, latest version on the date of application]. The average pore size (average pore diameter; d50) of the uncoated filters is at least 7 µm, for example from 7 µm to 34 µm, preferably more than 10 µm, in particular more preferably from 10 µm to 25 µm, or very preferably from 15 µm to 20 µm [measured according to DIN 66134, latest version on the date of application]. The completed filters having a pore size (d50) of typically 10 µm to 20 µm and a porosity of 50% to 65% are particularly preferred.

In general and according to the invention, pyrogenically produced metal powders are understood to be those obtained by flame hydrolysis or flame oxidation from a metal precursor in a flame and having properties such as are described for flame-synthesized particulate products in the following references, Gutsch A. et al. (2002) KONA (No. 20); Li S. et al. (2016) Progress in Energy and Combustion Science (55); Ulrich G. (1971) Combustion Science and Technology (vol. 4). Such processes have already been established industrially since 1944, for example, at Degussa AG. The first patents for this originate from the years 1931 to 1954 (U.S. Pat. Nos. 1,967,235A, 2,488,440A, DE948415C, DE 952891C). Pyrogenic silica (https://de.wikipedia.org/w/index.php?title=Pyrogenes_Siliciumdioxid&oldid=1 82147815) is sold, for example, by Evonik under the name Aerosil® or pyrogenic aluminum oxide under the name Aeroxide® (https://www.aerosil.com/product/aerosil/downloads/ti-1331-aerosil-and-aeroxide-for-glossy-photo-inkjet-media-en.pdf). In general, this method makes it possible to produce high-surface compounds, in particular oxides of various metals with a very low tamped density of <100 kg/m³, preferably <80 kg/m³ and very preferably <60 kg/m³ (measured according to standard DIN EN ISO 787-11— latest version on the date of application), which are preferably used according to the invention. The porosity of these pyrogenic materials, for example of the metal oxides, is >90%, preferably >93% and very preferably >95%. This is determined from the ratio of the tamped density to the primary particle density or the true non-porous density of the respective oxides. The formula for this is:

Porosity=1−tamped density/true density

With the example of aluminum oxide, the true density (https://de.wikipedia.org/w/index.php?title=Reindichte&oldid=164022376) is 3200 to 3600 kg/m³, and the tamped density of the pyrogenic oxides is only about 50 kg/m³. Thus, 1 m³ of powder contains only about 1.5% aluminum oxide. These are advantageously, for example, those selected from the group consisting of silicon dioxide, aluminum oxide, titanium dioxide, zirconium dioxide, cerium oxide, iron oxide, zinc oxide or their mixed oxides or mixtures thereof. However, it is also possible to produce other pyrogenic oxides, mixed oxides (so-called solid solutions) or doped mixed oxides.

In flame pyrolysis, approximately spherical primary particles initially arise in the nanometer range (d50: 5-50 nm), which sinter together during the further reaction to form highly porous chain-shaped aggregates. The aggregates usually have an average particle size (d50) of <0.5 µm and can then conglobate to form agglomerates having an average particle size of 10-100 µm (FIG. 1, (https://de.wikipedia.org/wiki/Pyrogenes_Siliciumdioxid)). In contrast to the agglomerates, which as a rule can be separated relatively easily into the aggregates by introducing energy, the aggregates are decomposed further into the primary particles only by intensive introduction of energy (Manuel Gensch, dissertation, Mechanische Stabilität von Nanopartikel-Agglomeraten bei mechanischen Belastungen, ISBN: 978-3-8440-6110-9, Shaker Verlag). In the present case, the particle sizes are measured off-line by means of laser diffraction according to the standard ISO 13320 (latest version on the date of application). If a d50 value for particles is referred to in the present text, this means the d50 value of a Q3 distribution.

According to the invention, a method is therefore preferred in which the pyrogenic high-melting compound is exposed to a fluid-dynamic stress (shear force) before the application to the filter. Depending on the intensity of the shear force, it can therefore be achieved in this modification that the powder is deagglomerated or/or deaggregated. The powder can thus be deposited either only on the wall of the wall-flow filter, on and in its wall, or only in the wall. As a result, the wall-flow filter can be adapted well to the underlying purification problem (for example filtering of small particulate or larger particulate soots from the exhaust gas of an internal combustion engine). The strength of the shear force can be determined from preliminary tests. The lower limit of the shear force will be found where the agglomerates of the pyrogenic compound can be split into smaller compartments. An upper limit in this respect will be formed by the division of the aggregates into smaller units as far as the primary particles.

The shearing force exerted on the powder may be caused by means known to the person skilled in the art. In order to also get more of the powders, for example, into the pores of the filter, at least some particle diameters of the powder should be smaller than the pore diameters of the wall-flow filter. The particle diameters of the agglomerates can be reduced by the milling steps for oxidic powders known to the person skilled in the art. For the pyrogenic materials, the use of which forms the basis for this invention, methods with shearing and/or impact stresses are preferred as methods for introducing the shear force. Atomizer nozzles are included, for example, among the high shearing methods. On the other hand, wind sifters, counter-jet mills and the impingement on baffle plates belong to the methods which perform the breaking up of the agglomerates of pyrogenic oxides predominantly by impact stress. The shear force is therefore preferably produced by one or more devices selected from the group consisting of a wear-free atomizer nozzle, a wind sifter, a mill and a baffle plate.

The most preferred use, according to the invention, of shearing and wear-resistant atomizer nozzles in combination, for example, with a baffle plate, makes it possible to produce the required particle sizes in the process during coating (Break up and Bounce of TiO2 agglomerates by impaction, Ihalainen, M.; Lind, T.; Arffman, A.; Torvela, T.; Jokiniemi, J. in: Aerosol Science and Technology, vol. 48, no. 1, 2014, p. 31-41; Interparticle forces in silica nanoparticle agglomerates, Seipenbusch, M. Rothenbacher, S. Kirchhoff, M. Schmid, H.-J. Kasper, G. Weber, A. P. in Journal of Nanoparticle Research; 12, 6; 2037-2044; Manuel Gensch, dissertation, Mechanische Stabilität von Nanopartikel-Agglomeraten bei mechanischen Belastungen, ISBN: 978-3-8440-6110-9, Shaker Verlag; Trockene Desagglomeration von Nanopartikelagglomeraten in einer Sichtermühle, Sascha Füchsel*, Klaus Husemann and Urs Peuker, Chemie Ingenieur Technik 2011, 83, no. 8, 1262-1275).

In this case, the particle agglomerates are comminuted to a d50 of, for example, approximately 2 to 8 µm, for example by the wear-resistant atomizer nozzle, fractions of a second prior to the application to the filter. In this way, and by dilution of the aerosol with an additional transport gas, renewed agglomeration is avoided. If there is a need for even finer particles, an additional baffle plate dispersion is advantageously used. Here, too, the dispersion is carried out fractions of a second before the coating, so that renewed agglomeration of the particles is avoided. By means of the mass flow and the impingement speed on the baffle plate, the particle sizes can optionally be changed continuously. These two dispersing methods in conjunction with the use of the pyrogenic metal compounds enable a rapidly modifiable, flexible and cost-effective process which can be adapted to the different filter qualities or requirements.

The techniques illustrated here make it possible to adjust the particle sizes which are suitable for the present purpose very precisely. The particle sizes (d50) of the pyrogenic metal compounds, in particular of the metal oxides, are in the region of the primary particles, 1-100 nm, preferably 10-80 nm and very preferably 20-50 nm, when applied in the pores of the wall-flow filter. As a result, these particles can also be deposited in a sufficient quantity in the superficially situated pores of the wall-flow filter. If—as stated—an incorporation of the powder into the pores is not desired, the d50 value is rather 0.5-100, more preferably 1-50 and very preferably 5-20 μm. Mixtures of both size regimes during the application, optionally staggered, are also conceivable. As a rule, the particle size distribution of the powder before the application is preferably in a range of 0.1-50 μm (d50).

The surface area of the particles in the powder is very high in this case. Advantageously, the pyrogenic high-melting compound has a BET surface area of >50 m2/g, more preferably >70 m2/g and very preferably >900 m2/g. The BET surface area is determined in accordance with DIN ISO 9277:2003-05 (Determination of the specific surface area of solids by gas adsorption using the BET method). The virtually pore-free primary particles having a particle diameter of <100 nm even produce a high specific surface area of up to over 200 $m^2/g$, which is available for the deposition of the nanoparticles.

Table 1 shows the dependence of the outer surface area on particle size. For the calculation, the true non-porous density of aluminum oxide was assumed to be 3600 $kg/m^3$ and the particle shape assumed to be a sphere.

| | | Particle diameter (d50) [μm] | | | | | | | |
|---|---|---|---|---|---|---|---|---|---|
| | | 8 | 4 | 2 | 1 | 0.5 | 0.1 | 0.03* | 0.01* |
| Outer surface area | $m^2/g$ | 0.2 | 0.4 | 0.8 | 1.7 | 3.3 | 16.7 | 55.6 | 166.7 |

*Region of the pyrogenic metal compound: primary particle diameter < 100 nm

The high outer surface area provides an excellent deposition surface for the particles, in particular soot particles in the nanometer range. The low tamping density of the pyrogenic metal compound and the virtually pore-free primary particles means an extremely high porosity available for the flow. Thus, the pressure rise resulting from the pyrogenic powder on the filter is very low.

Table 2 shows, by way of example, some data of the pyrogenic oxides in comparison with customary highly porous aluminum oxides such as Puralox® from Sasol.

Table 2: Characteristic data compiled by way of example for a pyrogenic aluminum oxide produced by Evonik. The pyrogenic aluminum oxide C has a primary particle size of 13 nm. The density of the primary particles is about 3200 g/l. Puralox from Sasol was used here as a comparison.

| | Porosity | BET surface area $m^2/g$ | Tamped density g/liter | Average primary grain size nm | Average agglomerate size depending on shear energy μm |
|---|---|---|---|---|---|
| Pyrogenic aluminum oxide C | 98.5% | about 100 | about 50 | 13 | 1 to 10 |
| Commercially available highly porous aluminum oxides in catalysis | about 80% | to over 200 | about 600-1200 | >1000 | unmilled 20 to 50 |

In a specific embodiment of the invention, the optionally catalytically activated pyrogenic high-melting compounds in the powder/gas aerosol can be mixed with further non-pyrogenic high-melting compounds. Prior to being brought into the wall-flow filter, the pyrogenic metal compounds are advantageously also mixed with other non-pyrogenic materials, e.g. oxides selected from the group consisting of silicon dioxide, aluminum oxide, titanium dioxide, zirconium dioxide, cerium oxide, iron oxide, zinc oxide or their mixed oxides or mixtures thereof, optionally with noble metal-coated oxides or, if appropriate, ion-exchanged zeolites and much more. Mixed oxides with other metals, such as iron on the basis of the above-mentioned group, can represent catalytically interesting properties for specific reaction sequences. As a result, the good filtration property and the low pressure loss caused by the pyrogenic materials are largely retained, while the other non-pyrogenic materials can provide additional catalytic properties. Accordingly, it is also preferably possible to mix the pyrogenically produced metal oxide powders with the other metal oxide powders and to apply them to the wall-flow filter. The individual powders each on their own or both powders together can have catalytic activity, for example due to noble metal addition. This allows for an inexpensive standard process for a variety of properties of the product. The strong crosslinking of the pyrogenic compounds also leads to the fact that mixtures of pyrogenic metal compounds with customary non-pyrogenic materials, for example metal oxides with a low outer surface area, lead to the same advantages with regard to filtration efficiency and pressure loss, but the amounts of powder can be significantly reduced.

In a preferred embodiment, the filter may have been catalytically coated prior to the application of the powder/gas aerosol. Here, catalytic coating is understood to mean the ability to convert harmful constituents of the exhaust gas from internal combustion engines into less harmful ones. The exhaust gas constituents NOx, CO, and HC and particulate matter should be mentioned here in particular. This catalytic activity is provided according to the requirements of the person skilled in the art by a coating of the wall-flow filter with a catalytically active material. The term "coating" is accordingly to be understood to mean the application of catalytically active materials to the wall-flow filter. The coating assumes the actual catalytic function. In the present case, the coating is carried out by applying a correspondingly low-viscosity aqueous suspension, also called washcoat, or solution of the catalytically active components to the wall-flow filter, see, for example, according to EP1789190B1. After application of the suspension/solution, the wall-flow filter is dried and, if applicable, calcined at an increased temperature. The catalytically coated filter preferably has a loading of 20 g/l to 200 g/l, preferably 30 g/l to 150 g/l. The most suitable amount of loading of a filter coated in the wall depends on its cell density, its wall thickness, and the porosity. In the case of common medium-porous filters (<60% porosity) with, for example, 200 cpsi cell density and 8 mil wall thickness, the preferred loading is 20 g/l to 50 g/l (based on the outer volume of the filter substrate). Highly porous filters (>60% porosity) with, for example, 300 cpsi and 8 mil have a preferred load of 25 g/l to 150 g/l, particularly preferably 50 g/l to 100 g/l.

In principle, all coatings known to the person skilled in the art for the automotive exhaust-gas field are suitable for the present invention. The catalytic coating of the filter may preferably be selected from the group consisting of three-way catalyst, SCR catalyst, nitrogen oxide storage catalyst, oxidation catalyst, soot-ignition coating. With regard to the individual catalytic activities coming into consideration and their explanation, reference is made to the statements in WO2011151711A1. Particularly preferably, this has a catalytically active coating having at least one metal-ion-exchanged zeolite, cerium/zirconium mixed oxide, aluminum oxide, and palladium, rhodium, or platinum, or combinations of these noble metals.

The powders used here can be used as such according to the invention as described above. However, it is also conceivable to use dry, pyrogenic metal compounds, in particular oxide powders, and/or non-pyrogenic metal compounds, in particular oxides, which support a catalytic activity with regard to exhaust gas aftertreatment. Accordingly, the powder itself can likewise be catalytically active with regard to reducing harmful substances in the exhaust gas of an internal combustion engine. Suitable for this purpose are all activities known to the person skilled in the art, such as TWC, DOC, SCR, LNT, or soot-burn-off-accelerating catalysts. The powder will generally have the same catalytic activity as an optionally performed catalytic coating of the filter. This further increases the overall catalytic activity of the filter as compared with filters not coated with catalytically active powder. In this respect, it may be possible to use pyrogenic aluminum oxide, for example, impregnated with a noble metal for producing the powder/gas aerosol. Three-way activity with a coating comprising palladium and rhodium and an oxygen storage material such as cerium zirconium oxide is preferred in this context. It is likewise conceivable for catalytically active material to be used for the SCR reaction. Here, the powder may consist, for example, of zeolites or zeotypes exchanged with transition metal ions. Very particular preference is given in this context to the use of zeolites exchanged with iron and/or copper. CuCHA (copper-exchanged chabazite; http://europe.iza-structure.org/IZA-SC/framework.php?STC=CHA) or CuAEI (http://europe.iza-structure.org/IZA-SC/framework.php?STC=AEI) are extremely preferably used as material for producing the powder/gas aerosol. Further advantageously, an activity of the powder may consist in the improved soot combustion.

In a further embodiment, the present invention relates to a wall-flow filter as described above. The product-characteristic advantages described above in the context of the method according to the invention also apply, mutatis mutandis, to the wall-flow filter according to the invention.

The wall-flow filters according to the invention can be used in any application in which finely particulate solids have to be separated from gases. This process is advantageously used in the field of the automobile exhaust gases which are loaded with finely distributed soot particles from incomplete combustion. The described wall-flow filters may be used in an automobile exhaust system with other catalysts selected from the group consisting of TWC, SCR catalyst, nitrogen oxide storage catalyst, diesel oxidation catalyst, and others.

The wall-flow filter produced according to the invention exhibits an excellent filtration efficiency with only a moderate increase in exhaust-gas back pressure as compared with a wall-flow filter in the fresh state to which pyrogenic powder has not been applied. The worse the filtration efficiency of the filter, the greater the increase in filtration efficiency resulting from the coating with pyrogenic metal compounds. This is particularly noticeable in the case of filters which have been previously coated with a washcoat. The wall-flow filter previously coated with washcoat according to the invention preferably exhibits a relative increase in filtration efficiency of at least 5%, preferably at least 10%, and very particularly preferably at least 20% with a relative increase in the exhaust-gas back pressure of the fresh wall-flow filter of at most 40%, preferably at most 20%, and very particularly preferably at most 10%, as compared with a fresh filter not treated with powder. Particularly advantageous is an improvement in filtration efficiency of at least 20% with a maximum back pressure increase of no more than 10%.

The wall-flow filters presented here are characterized by a good filtration efficiency paired with a very low increase in the exhaust-gas back pressure. It is assumed that the pyrogenically produced metal compounds after comminution only crosslink again to form larger agglomerates during deposition in the filter. They then form a loose network on the wall and/or in the pores. Primarily the particle size of the agglomerates after the comminution described, the amount of powder, the pore diameter and the open porosity of the filter determine whether the pores or the cell surface or both are coated. The gases can flow through the extremely loose aggregate material without a large pressure loss. The large outer surface area of the pyrogenic metal compounds in turn brings about a very good filtration efficiency for the soot particles in the nanometer range. Very small amounts of pyrogenic oxides are sufficient to produce large outer surface areas. The oxides conventionally used in catalysis have large internal surface areas which are present due to a high porosity in the nanometer range, but these are not accessible for the filtration of nanoparticles.

Dry in the sense of the present invention accordingly means exclusion of the application of a liquid, in particular water. In particular, the production of a suspension of the powder in a liquid for spraying into a gas stream should be avoided. A certain moisture content may possibly be tolerable both for the filter and for the powder, provided that achieving the objective—the most finely distributed deposition of the powder possible in or on the input surface—is not negatively affected. As a rule, the powder is free-flowing and dispersible by energy input. The moisture content of the powder or of the filter at the time of application of the powder should be less than 20%, preferably less than 10%, and very particularly preferably less than 5% (measured at 20° C. and normal pressure, ISO 11465, latest version on the date of application).

In FIG. 1 flame pyrolysis for the production of pyrogenic silicon dioxide is pictorially represented. The particles which form primarily aggregate as a result and finally accumulate together to form agglomerates (larger chains of primary particles). File: Fumed silica process.svg. (2016, November 28). Wikimedia Commons, the free media repository. Retrieved 08:28, Nov. 7, 2018 from https://commons.wikimedia.org/w/index.php?title=File:Fumed_silica_process. svg&oldid=222460038.

Figure 2:
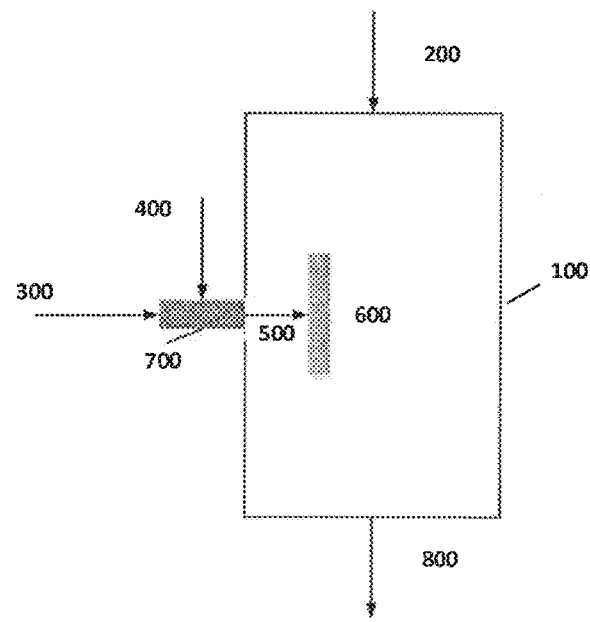

FIG. 2 explains the method according to the invention and the comminution and mixing chamber in more detail: The pyrogenic oxide 400 is driven with a gas 300 under pressure under high shearing through the wear-free atomizer nozzle 700. The speed may range up to the speed of sound. After exiting the atomizer nozzle, the gas/powder mixture 500 impinges on the baffle plate 600 located in the comminution and mixing chamber 100. The gas/powder mixture thus formed with the comminuted powder agglomerates is then mixed with the gas stream 200 and then passes as a diluted gas/powder mixture 800 to coat the filter. The diluent gas 200 is required so that the inflow rate of the filter during coating can be varied independently of the amount of atomizer gas.

EXAMPLE 1

Coating a raw washcoat-free filter having dimensions 4.66"×6.00" 300/8 with powder.

The pyrogenically produced powder was dispersed with the aid of an atomizer nozzle at 2 bar and sucked into the filter at a rate of 20 m/s.

|  | Relative* increase in filtration efficiency | Relative* pressure increase |
| --- | --- | --- |
| 0.6 g pyrogenic $Al_2O_3$/liter filter volume | 5.5% | 2% |
| 1.2 g pyrogenic $Al_2O_3$/liter filter volume | 9% | 3% |
| 0.3 g pyrogenic $Al_2O_3$ + 1.2 g $Al_2O_3$ with a d50 of 3 μm/liter filter volume | 6% | 1% |

*Relative to an uncoated raw filter substrate without additional powder coating

Example 2

In a 1st step, the filter was coated with 50 g/l washcoat in the porous filter wall, dried and calcined. It was then coated with 2 g/l pyrogenically produced powder. The powder was dispersed at 2 bar with the aid of a wear-free atomizer nozzle and sucked into the filter at a rate of 20 m/s. The filtration efficiency increase and the increase in pressure loss were determined at 600 m³/h relative to the powder-free filter.

|  | Relative* increase in filtration efficiency | Relative* pressure increase |
| --- | --- | --- |
| 2 g pyrogenic $Al_2O_3$/liter filter volume | 47% | 10% |

*Relative to the substrate coated only with washcoat

The invention claimed is:

1. A method for producing a wall-flow filter for purifying gases from small particulate solids, wherein a dry powder/gas aerosol is applied to the inlet region of the dry filter, characterized in that
the powder contains a pyrogenic, high-melting metal compound produced by flame hydrolysis or flame oxidation from a metal precursor in a flame, and the amount of pyrogenic high-melting compound in the filter is less than 5 g/l, and
wherein the pyrogenic high-melting compound is subjected to a shear force prior to the application to the filter.

2. Method according to claim 1, characterized in that the pyrogenic high-melting compound is selected from the group consisting of silicon dioxide, aluminum oxide, titanium dioxide, zirconium dioxide, cerium oxide, iron oxide, zinc oxide, mixed oxides of the aforementioned oxides or mixtures thereof.

3. Method according to claim 1, characterized in that the shear force is caused by one or more devices selected from the group consisting of a wear-free atomizer nozzle, a wind sifter, a mill, and a baffle plate.

4. Method according to claim 1, characterized in that the average particle size (d50) of the pyrogenic high-melting compound is between 0.1 μm and 50 μm.

5. Method according to claim 1, characterized in that the pyrogenic high-melting compound has a BET surface area of >50 m²/g.

6. Method according to claim 1, characterized in that the pyrogenic high-melting compound in the powder/gas aerosol is mixed with further non-pyrogenic high-melting compounds.

7. Method according to claim 1, characterized in that the wall-flow filter has been catalytically coated prior to application of the pyrogenic high-melting compound.

8. Method according to claim 1, characterized in that the pyrogenic and/or non-pyrogenic compounds themselves are catalytically active.

9. Method according to claim 1, wherein the shear force is caused, at least in part, by an atomizer nozzle against which the pyrogenic high-melting compound contacts and is broken up.

10. Method according to claim 1, wherein the shear force is caused, at least in part, by a baffle plate against which the pyrogenic high-melting compound contacts and is broken up.

11. Method according to claim 1, wherein the shear force is caused by contact of the pyrogenic high-melting compound first against an atomizer nozzle and subsequently against a baffle plate.

12. Method according to claim 1, wherein the shear force is caused by at least two devices selected from the group consisting of a wear-free atomizer nozzle, a wind sifter, a mill, and a baffle plate.

13. Method according to claim 1, wherein the pyrogenic high-melting compound in the powder/gas aerosol is a catalytically active pyrogenic high-melting compound and is mixed with a non-pyrogenic high-melting compound which is also catalytically active.

14. Method according to claim 1, wherein the wall-flow filter is catalytically coated with a coating having metal ion exchanged zeolite prior to application of the pyrogenic high-melting compound.

15. Method according to claim 1, wherein the powder contains a pyrogenic, high-melting metal compound produced by flame hydrolysis.

16. Method according to claim 1, wherein the powder contains a pyrogenic, high-melting metal compound produced by flame oxidation.

17. Method according to claim 1, wherein the high-melting metal compound is dispersed within an aerosol gas; and the high-melting metal compound and aerosol gas are then fed into a stream of a diluent transportation gas supply.

18. Method according to claim 17, wherein the diluent transportation gas supply has a lower flow rate than the aerosol gas and high melting compound mixture flow rate that occurs at a time of being subjected to fluid-dynamic stress.

19. A wall-flow filter formed by the method according to claim 1.

20. A method for the purification of automobile gases comprising passing the automobile gases through the wall-flow filter according to claim 19.

* * * * *